(12) United States Patent
Yamada

(10) Patent No.: US 11,368,072 B2
(45) Date of Patent: Jun. 21, 2022

(54) ROTARY DRIVING APPARATUS

(71) Applicant: SUBARU CORPORATION, Tokyo (JP)

(72) Inventor: Shutaro Yamada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 419 days.

(21) Appl. No.: 16/675,898

(22) Filed: Nov. 6, 2019

(65) Prior Publication Data

US 2020/0204046 A1 Jun. 25, 2020

(30) Foreign Application Priority Data

Dec. 19, 2018 (JP) .............................. JP2018-237280

(51) Int. Cl.
| | |
|---|---|
| *H02K 11/25* | (2016.01) |
| *H02K 9/19* | (2006.01) |
| *H02P 6/08* | (2016.01) |
| *H02P 29/024* | (2016.01) |
| *H02P 29/032* | (2016.01) |
| *H02K 1/20* | (2006.01) |

(52) U.S. Cl.
CPC .............. *H02K 11/25* (2016.01); *H02K 1/20* (2013.01); *H02K 9/19* (2013.01); *H02P 6/08* (2013.01); *H02P 29/024* (2013.01); *H02P 29/032* (2016.02)

(58) Field of Classification Search
CPC ...... E02D 29/0225; H02K 1/20; H02K 11/25; H02K 5/207; H02K 9/19; H02P 29/024; H02P 29/032; H02P 29/60; Y02P 10/20
See application file for complete search history.

(56) References Cited

U.S. PATENT DOCUMENTS 9,574,805 B2 * 2/2017 Yang ..................... F25B 49/022
2007/0278869 A1 * 12/2007 Taketsuna ................ H02K 9/19
310/54

FOREIGN PATENT DOCUMENTS

| JP | 2006197772 A | 7/2006 |
| JP | 2009291002 A | 12/2009 |
| JP | 5492170 B2 * | 5/2014 |

* cited by examiner

*Primary Examiner* — Naishadh N Desai
(74) *Attorney, Agent, or Firm* — Troutman Pepper Hamilton Sanders LLP

(57) ABSTRACT

A rotary driving apparatus includes a motor including a rotor and a stator, a first temperature sensor that detects a stator's temperature and issues a first detection signal including stator's temperature information, a housing accommodating the motor, a cooling medium supply provided in the housing to supply a cooling medium to the motor, an open-close valve provided at a housing's lower portion to open to store the cooling medium inside the housing and close to discharge the cooling medium from the housing, and a controller that predicts a stator's temperature change on the basis of the first detection signal to close, if the stator's temperature is predicted to exceed a motor's operation guarantee temperature, while the motor is driven at an operating point within a motor's time rating region, the open-close valve before starting motor's output restriction, to thereby increase a stored cooling medium amount inside the housing.

15 Claims, 8 Drawing Sheets

| MAP 2 (THRESHOLD TEMPERATURE Tth) | | | | | |
|---|---|---|---|---|---|
| | OIL TEMPERATURE AND OIL QUANTITY | | | | |
| | 25°C 2L/min | ... | ... | ... | 100°C 5L/min |
| CURRENT VALUE [Arms] 450~ | 170°C | ... | ... | ... | 160°C |
| 400~449 | 175°C | ... | ... | ... | 165°C |
| ... | ... | ... | ... | ... | ... |
| ... | ... | ... | ... | ... | ... |
| ... | ... | ... | ... | ... | ... |
| 200~249 | 190°C | ... | ... | ... | ... |

FIG. 8

| MAP 3 (CLOSING PERIOD FOR OPEN-CLOSE VALVE) | | | | | |
|---|---|---|---|---|---|
| | OIL TEMPERATURE AND OIL QUANTITY | | | | |
| | 25°C 2L/min | ... | ... | ... | 100°C 5L/min |
| CURRENT VALUE [Arms] 250~300 | 5sec | ... | ... | ... | 10sec |
| 200~249 | 4sec | ... | ... | ... | 9sec |
| ... | ... | ... | ... | ... | ... |
| ... | ... | ... | ... | ... | ... |
| ... | ... | ... | ... | ... | ... |
| 0~50 | 2sec | ... | ... | ... | ... |

FIG. 9

ROTARY DRIVING APPARATUS

CROSS-REFERENCE TO RELATED APPLICATIONS

The present application claims priority from Japanese Patent Application No. 2018-237280 filed on Dec. 19, 2018, the entire contents of which are hereby incorporated by reference.

BACKGROUND

The technology relates to a rotary driving apparatus that includes a motor and that is mounted in a drive system of a vehicle, for example.

Such methods have already been proposed that inject or drip oil onto a coil of a motor used to drive a vehicle, for example, to cool down the coil. Reference may be made to Japanese Unexamined Patent Application Publication Nos. 2006-197772 and 2009-291002, for example.

SUMMARY

An aspect of the technology provides a rotary driving apparatus including a motor, a first temperature sensor, a housing, a cooling medium supply, an open-close valve, and a controller. The motor includes a rotor and a stator. The first temperature sensor detects a temperature of the stator and issues a first detection signal including information of the temperature of the stator. The housing accommodates the motor. The cooling medium supply is provided in the housing. The cooling medium supply is able to supply a cooling medium to the motor. The open-close valve is provided at a lower portion of the housing. The open-close valve is able to open and close to allow, when closed, the cooling medium to be stored inside the housing and to allow, when open, the cooling medium to be discharged from inside the housing. The controller predicts a change in temperature in the stator on the basis of the first detection signal. The controller closes, on a condition that the temperature of the stator is predicted to exceed an operation guarantee temperature for the motor, and that the motor is driven at an operating point falling within a time rating region for the motor, the open-close valve before starting output restriction for the motor, to thereby increase an amount of the cooling medium stored in the housing.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 8 is a map illustrating a threshold temperature determined, for the motor, from a relationship between a temperature and a supply rate of the cooling medium and a value of a current to be supplied to the motor. Hereinafter, the map is also referred to as a map 2.

FIG. 9 is a map illustrating a closing period determined, for an open-close valve, from a relationship between a temperature and a supply rate of the cooling medium and a value of a current to be supplied to the motor. Hereinafter, the map is also referred to as a map 3.

DETAILED DESCRIPTION

Figure 1:
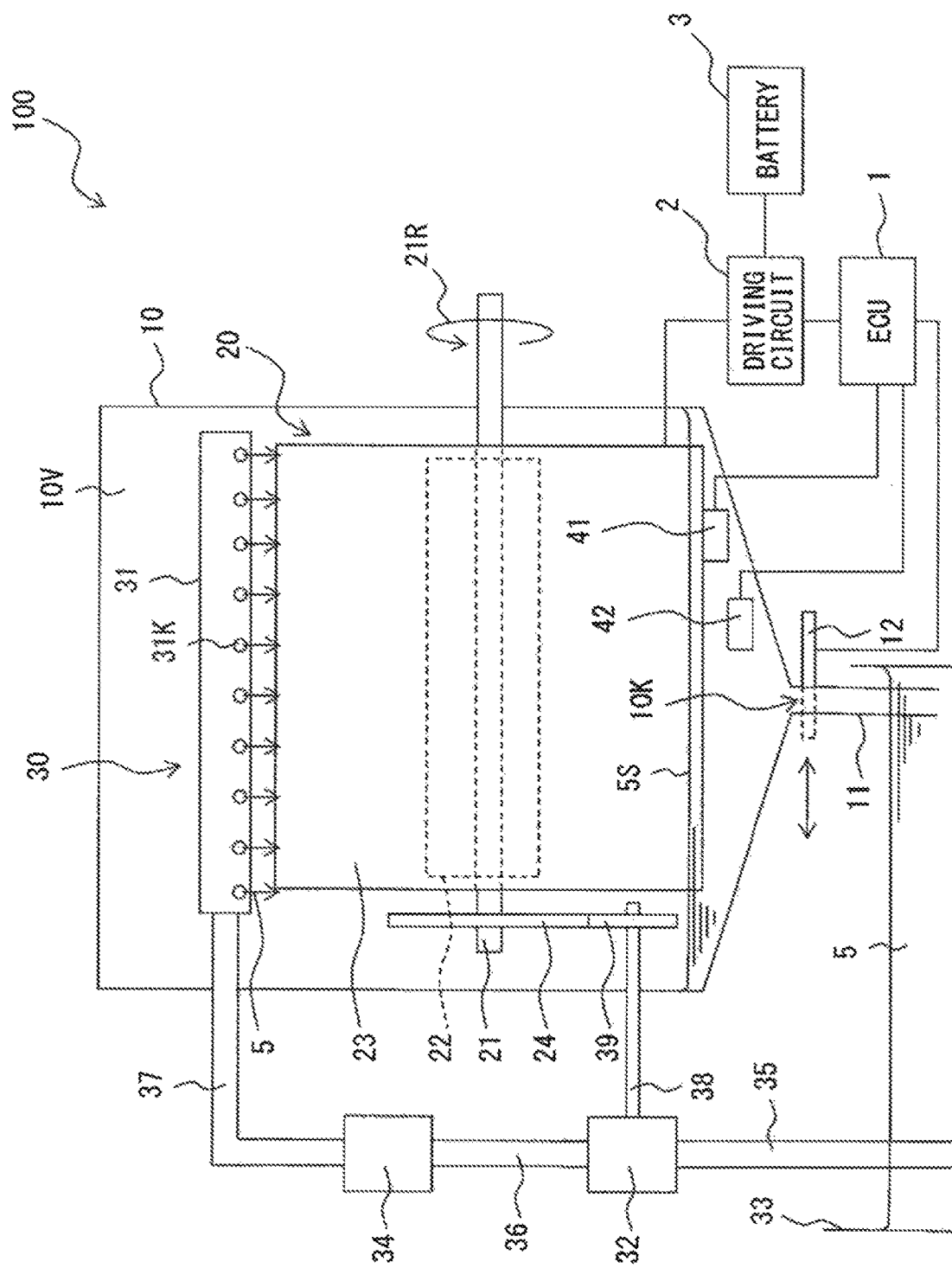
FIG. 1 is a schematic diagram illustrating an outline configuration example of a vehicle driving apparatus according to one example embodiment of the technology.

In the following, some example embodiments of the technology are described in detail, with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. It is to be noted that the description is made in the following order.

1. Example Embodiment (an example of a vehicle driving apparatus)
2. Modification Examples In such a rotary driving apparatus that includes a motor, such protection control takes place that implements output restriction for the motor to avoid the motor from being damaged due to that the motor is continuously used and excessively heated. When the protection control takes place, however, an output of the motor is also restricted. In such a case, it can be difficult to fully exert a travel capability of a vehicle, for example.

It is desirable to provide a rotary driving apparatus that makes it possible to avoid a motor from being excessively heated, but to fully exert its output capability.

1. Example Embodiment

Outline Configuration of Vehicle Driving Apparatus 100

FIG. 1 schematically illustrates an outline configuration example of a vehicle driving apparatus 100 according to one example embodiment of the technology. The vehicle driving apparatus 100 may be mounted on a vehicle such as an electric vehicle or a hybrid electric vehicle (HEV) to drive the vehicle, for example. As illustrated in FIG. 1, the vehicle driving apparatus 100 may include a housing 10, a motor 20, a cooling medium supply 30, a motor temperature sensor 41, and a cooling medium temperature sensor 42. The vehicle driving apparatus 100 may further include an electronic control unit (ECU) 1, a driving circuit 2, and a battery 3. In one embodiment, the vehicle driving apparatus 100 may serve as a "rotary driving apparatus".

The housing 10 may include an internal space 10V, an opening 10K, a drain pipe 11, and an open-close valve 12. The internal space 10V may accommodate the motor 20, for example. The opening 10K may be provided at a lower portion of the housing 10. The drain pipe 11 may extend downward from the opening 10K. The open-close valve 12 may be provided to the drain pipe 11. The open-close valve 12 may be an electromagnetic valve, for example. In accordance with a control signal from the ECU 1, the open-close valve 12 may implement open and close operations for a flow channel. In a case where the open-close valve 12 is not powered by electricity, i.e., is in an off state, for example, the flow channel may be open. In a case where the open-close valve 12 is powered by electricity, i.e., is in an on state, the flow channel may be closed.

The motor 20 may be a three-phase alternating current motor, for example. The motor 20 may be accommodated inside the housing 10. The motor 20 may include a drive shaft 21, a rotor 22, and a stator 23. The rotor 22 may rotate, together with the drive shaft 21, about a rotation center of the drive shaft 21. The stator 23 may be provided in a fixed manner to the housing 10 to surround the rotor 22. The stator 23 may include a core and a coil, for example. As the coil is powered by electricity, the stator 23 may allow electromagnetic induction to occur to rotate the rotor 22. A first end of the drive shaft 21 may protrude outside the housing 10 to transmit power to an axle and other components, via mechanisms including a gear mechanism, for example. To a second end of the drive shaft 21 may be fixed a gear 24, for example.

The cooling medium supply 30 may be a mechanism that supplies a cooling medium 5 such as oil to the motor 20, for example. The cooling medium supply 30 may include a cooling medium discharge head 31, a pump 32, a vessel 33, a cooler 34, pipes 35 to 37, a drive shaft 38, and a gear 39. The cooling medium discharge head 31 may be provided with a plurality of openings 31K. The vessel 33 may store the cooling medium 5. The cooler 34 may cool down the cooling medium 5. The pipes 35 to 37 may respectively allow the cooling medium 5 to flow inside the pipes 35 to 37.

The pipe 35 may couple the vessel 33 to the pump 32. The pipe 36 may couple the pump 32 to the cooler 34. The pipe 37 may couple the cooler 34 to the cooling medium discharge head 31.

The cooler 34 may be provided downstream of the pump 32. The cooler 34 may be an air-cooling type cooler that allows heat to be exchanged between the cooling medium 5 discharged from the pump 32 and ambient air, for example, to cool down the cooling medium 5. The cooler 34 may not be limited to such an air-cooling type cooler. In one example embodiment, the cooler 34 may be a water-cooling type cooler that allows heat to be exchanged between the cooling medium 5 and cooling water, for example.

The pump 32 may be an electric pump that supplies the cooling medium 5 stored in the vessel 33 to the motor 20. The pump 32 may be driven by the motor 20 to suction, pressurize, and discharge the cooling medium 5 stored in the vessel 33. The cooling medium 5 discharged from the pump 32 may be press-fed to the cooler 34 via the pipe 36. The cooling medium 5 may be cooled down in the cooler 34. The cooling medium 5 may thereafter be supplied to the motor 20 via the pipe 37 and the cooling medium discharge head 31. Even in a case where the vehicle driving apparatus 100 is mounted on a hybrid electric vehicle, for example, use of the electric pump 32 makes it possible to supply the cooling medium 5 to the motor 20 at a constant amount regardless of a speed of an engine.

To a first end of the drive shaft 38 may be attached the gear 39 that engages with the gear 24. As the gear 24 attached to the drive shaft 21 of the motor 20 rotates, the drive shaft 38 may rotate together with the gear 39.

A second end of the drive shaft 38 may be coupled to the pump 32. As the drive shaft 38 rotates, the pump 32 may be driven. As the pump 32 is driven, the cooling medium 5 stored in the vessel 33 may be drawn via the pipe 35. As the cooling medium 5 is drawn by the pump 32, the cooling medium 5 may reach the cooling medium discharge head 31 via the pipe 36, the cooler 34, and the pipe 37. The cooling medium 5 may thereafter be discharged from the plurality of openings 31K. As described above, it is possible to supply the cooling medium 5 from the cooling medium supply 30 to the stator 23 of the motor 20. As the cooling medium 5 adheres to the stator 23, the cooling medium 5 may move downward. The cooling medium 5 may meanwhile absorb heat of the stator 23. The cooling medium 5 may thereafter stay in a lower portion of the internal space 10V. The cooling medium 5 staying in the lower portion of the internal space 10V may be discharged from the opening 10K via the drain pipe 11. The cooling medium 5 may be again stored in the vessel 33. Note that FIG. 1 illustrates a state where cooling normally takes place while the motor 20 is driven within a continuous rating region CR, for example. The continuous rating region CR will be described later. Hereinafter, the state described above may also be referred to as a normal cooling state. In one example embodiment, a fluid level 5S of the cooling medium 5 in the normal cooling state may lie at a low level to an extent that the stator 23 is partially in contact with the cooling medium 5, for example. In other words, in one example embodiment, portions facing each other of the rotor 22 and the stator 23 may be exposed to air in the normal cooling state without being immersed in the cooling medium 5.

Figure 2:
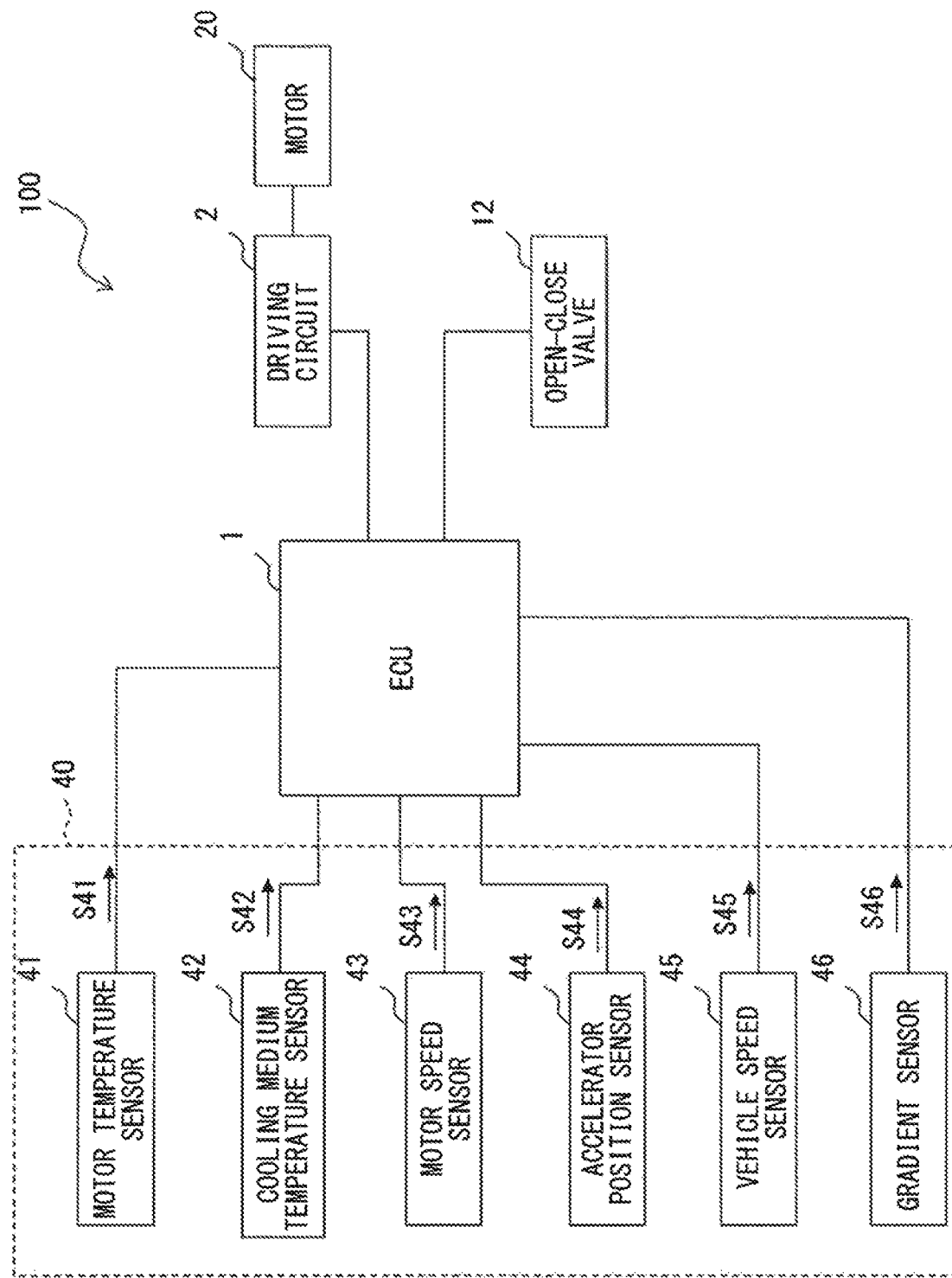
FIG. 2 is a block diagram illustrating a configuration example of a control mechanism in the vehicle driving apparatus illustrated in FIG. 1.

FIG. 2 is a block diagram illustrating a configuration example of a control mechanism in the vehicle driving apparatus 100 illustrated in FIG. 1. As illustrated in FIG. 2, the vehicle driving apparatus 100 may be provided with a sensor group 40. The sensor group 40 may include the motor temperature sensor 41 and the cooling medium temperature sensor 42. The sensor group 40 may include a plurality of sensors that detect an environment where the vehicle lies and a driving state of the vehicle, for example. In a specific but non-limiting example, the sensor group 40 may include a motor speed sensor 43, an accelerator position sensor 44, a vehicle speed sensor 45, and a gradient sensor 46, in addition to the motor temperature sensor 41 and the cooling medium temperature sensor 42, for example. The motor speed sensor 43 may detect a speed of the rotor 22 of the motor 20. The accelerator position sensor 44 may detect an accelerator position. The vehicle speed sensor 45 may detect a travel speed of the vehicle. The gradient sensor 46 may detect a gradient of a road surface on which the vehicle travels. The various kinds of sensors described above in the sensor group 40 may each be communicably coupled to the ECU 1 in a wireless or wired manner to respectively send, to the ECU 1, detection signals S41 to S46 including various kinds of information.

The motor temperature sensor 41 may be a temperature sensor provided near the stator 23 to detect a temperature of the stator 23. The motor temperature sensor 41 may include a thermistor, for example. The motor temperature sensor 41 may send the detection signal S41 to the ECU 1. In one embodiment, the detection signal S41 may serve as a "first detection signal". In one embodiment, the motor temperature sensor 41 may serve as a "first temperature sensor".

The cooling medium temperature sensor 42 may be a temperature sensor provided in the internal space 10V to detect a temperature of the cooling medium 5 staying at the lower portion of the internal space 10V, for example. The cooling medium temperature sensor 42 may be a thermistor, for example. The cooling medium temperature sensor 42 may send the detection signal S42 to the ECU 1. In one embodiment, the detection signal S42 may serve as a "second detection signal". In one embodiment, the cooling medium temperature sensor 42 may serve as a "second temperature sensor".

The driving circuit 2 may include an inverter that, on the basis of a torque signal from the ECU 1, converts direct current power supplied from the battery 3 into alternating current power, and outputs the alternating current power to the motor 20. The battery 3 may be a secondary battery that mainly stores direct current power necessary for traveling of the vehicle, and supplies the direct current power to the vehicle driving apparatus 100. Note that the battery 3 may be provided outside the vehicle driving apparatus 100.

In one embodiment, the ECU 1 may serve as a "controller". The ECU 1 may comprehensively determine a travel state of the vehicle on the basis of various kinds of information including detection signals from the sensor group 40, for example, to control driving operation of the vehicle. The ECU 1 may include a microcomputer including a central processing unit (CPU), a read only memory (ROM), and a random access memory (RAM), for example. In accordance with a travel state of the vehicle, for example, the ECU 1 may output an appropriate torque signal to the driving circuit 2 to control operation of the motor 20. In other words, as the ECU 1 increases or decreases alternating current power to be supplied from the driving circuit 2 to the motor 20, it is possible to increase or decrease drive torque.

The ECU 1 may comprehensively control how the motor 20 is driven on the basis of various kinds of information acquired from the sensor group 40. The ECU 1 may acquire an output requested to the motor 20 on the basis of an accelerator pedal position, i.e., a request of the driver, and a driving state of the vehicle, for example. The ECU 1 may thereafter output, to the driving circuit 2, a torque signal including information of the requested output. Hereinafter, the requested output may be referred to as a torque instruction value.

When a temperature of the stator 23 reaches a reference temperature TB lower than an operation guarantee temperature TA for the motor 20, the ECU 1 may start output restriction for the motor 20. In one example embodiment, the reference temperature TB and the operation guarantee temperature TA may respectively be 190° C. and 200° C., for example. The output restriction for the motor 20 may denote that a proportion of load torque with respect to rating torque of the motor 20, i.e., a load factor of the motor 20, is restricted from exceeding a predetermined value to prevent a temperature of the stator 23 from reaching the operation guarantee temperature TA. In a specific but non-limiting example, energy to be loaded to the motor 20 may be restricted during the output restriction for the motor 20. In one example embodiment, the energy to be loaded to the motor 20 may be a current supplied from the driving circuit 2 to the motor 20, for example. As a result, drive torque to be outputted from the motor 20 may also be restricted. With the output restriction for the motor 20 as described above, it is possible to prevent the motor 20 from being excessively heated. Hereinafter, the output restriction may also be referred to as load factor restriction.

Figure 3:
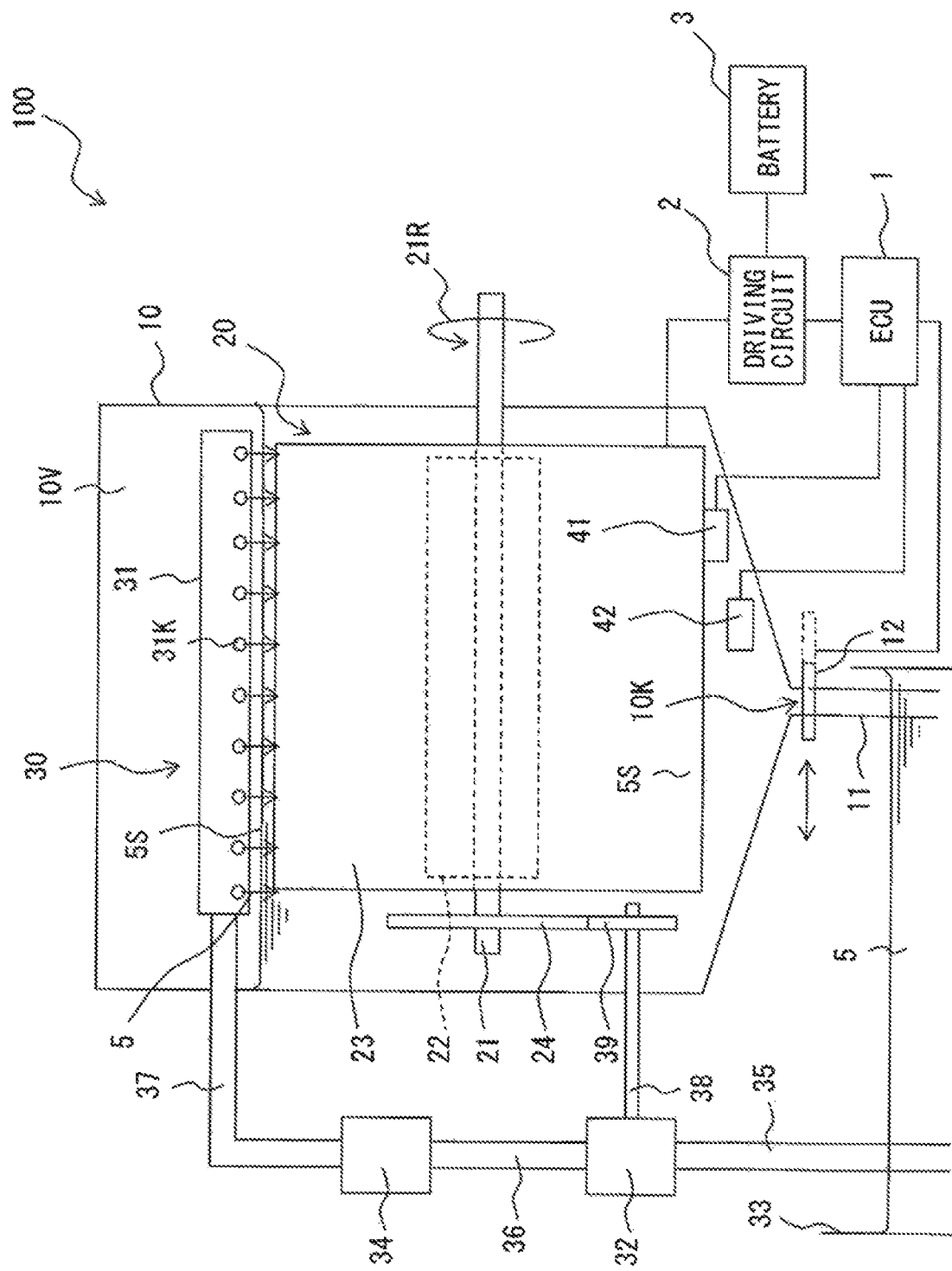
FIG. 3 is another schematic diagram illustrating an outline configuration example of the vehicle driving apparatus according to one example embodiment of the technology.

The ECU 1 may predict a change in temperature in the stator 23 on the basis of the detection signal S41. In a case where it is predicted that a temperature of the stator 23 exceeds the operation guarantee temperature TA, the ECU 1 may control the open-close valve 12 to close the flow channel in the drain pipe 11 before starting the output restriction for the motor 20 described above. As the open-close valve 12 closes, an amount of the cooling medium 5 stored in the internal space 10V of the housing 10 may increase. As illustrated in FIG. 3, for example, it is possible to immerse whole of the stator 23 in the cooling medium 5. In other words, it is possible with the ECU 1 to operate the open-close valve 12 to raise or lower a height position of the fluid level 5S of the cooling medium 5 stored in the internal space 10V, i.e., to adjust a level at which the stator 23 is immersed in the cooling medium 5. Note that FIG. 3 illustrates a state where cooling of the motor 20 is accelerated while the motor 20 is driven within a time rating region TR, for example. The time rating region TR will be described later. Hereinafter, the state described above may also be referred to as an accelerated cooling state.

The ECU 1 may predict a change in temperature in the stator 23 on the basis of a magnitude of energy to be loaded to the motor 20 and the detection signal S41 from the motor temperature sensor 41 to control operation of the open-close valve 12. In one example embodiment, the energy to be loaded to the motor 20 may be a current to be supplied to the motor 20, for example.

The ECU 1 may alternatively predict a change in temperature in the stator 23 on the basis of a magnitude of energy to be loaded to the motor 20, the detection signal S41, and the detection signal S42 to control operation of the open-close valve 12. In one example embodiment, the energy to be loaded to the motor 20 may be a current to be supplied to the motor 20, for example.

The ECU 1 may still alternatively predict a change in temperature in the stator 23 on the basis of a magnitude of energy to be loaded to the motor 20, the detection signal S41, the detection signal S42, and a supply rate of the cooling medium 5 to be supplied by the cooling medium supply 30 to the motor 20 to control operation of the open-close valve 12. In one example embodiment, the energy to be loaded to the motor 20 may be a current to be supplied to the motor 20, for example.

Furthermore, the ECU 1 may determine whether the motor 20 is driven at an operating point falling within a time rating region for the motor 20 or the motor 20 is driven at an operating point falling within a continuous rating region for the motor 20. In a case where the motor 20 is driven at an operating point falling within the time rating region, the ECU 1 may allow the open-close valve 12 to operate in accordance with first open and close control. In a case where the motor 20 is driven at an operating point falling within the continuous rating region, the ECU 1 may allow the open-close valve 12 to operate in accordance with second open and close control.

In the first open and close control described above, the ECU 1 may set a threshold temperature Tth at which the open-close valve 12 is closed in accordance with a magnitude of energy to be loaded to the motor 20. In the second open and close control described above, the ECU 1 may set a period during which the open-close valve 12 is closed in accordance with a magnitude of energy to be loaded to the motor 20. In one example embodiment, the period during which the open-close valve 12 is closed may be a period during which the motor 20 is immersed in the cooling medium 5.

The driving circuit 2 may drive the motor 20 on the basis of a torque signal outputted from the ECU 1, as described above.

Operation of Vehicle Driving Apparatus 100

To allow the vehicle to travel with the vehicle driving apparatus 100, a driver may operate a shift operation portion to select a drive range. Upon selection of the drive range, the ECU 1 may output an appropriate torque signal to the driving circuit 2 to start the motor 20. The motor 20 may generate drive torque to cause wheels to rotate in a predetermined direction. As a result, the drive torque generated in the motor 20 may be transmitted to the wheels via the drive shaft 21. The wheels may thus rotate in the predetermined direction. As a result, the vehicle travels.

Time Rating and Continuous Rating

As the coil is powered by electricity in the stator 23, heat is generated in the motor 20. In a case where the motor 20 is continuously driven for a specified certain period of time or longer, a temperature of the stator 23 may therefore eventually exceed the operation guarantee temperature for the motor 20 in some cases. Hereinafter, a region of operating points, within which it is possible to continuously drive the motor 20 without allowing a temperature of the stator 23 to exceed the operation guarantee temperature for the motor 20 for a period of time shorter than a specified certain period of time, may be referred to as a time rating region. Hereinafter, a region of operating points, within which a temperature of the stator 23 does not exceed the operation guarantee temperature for the motor 20 even if the motor 20 is continuously driven, may be referred to as a continuous rating region.

Figure 4:
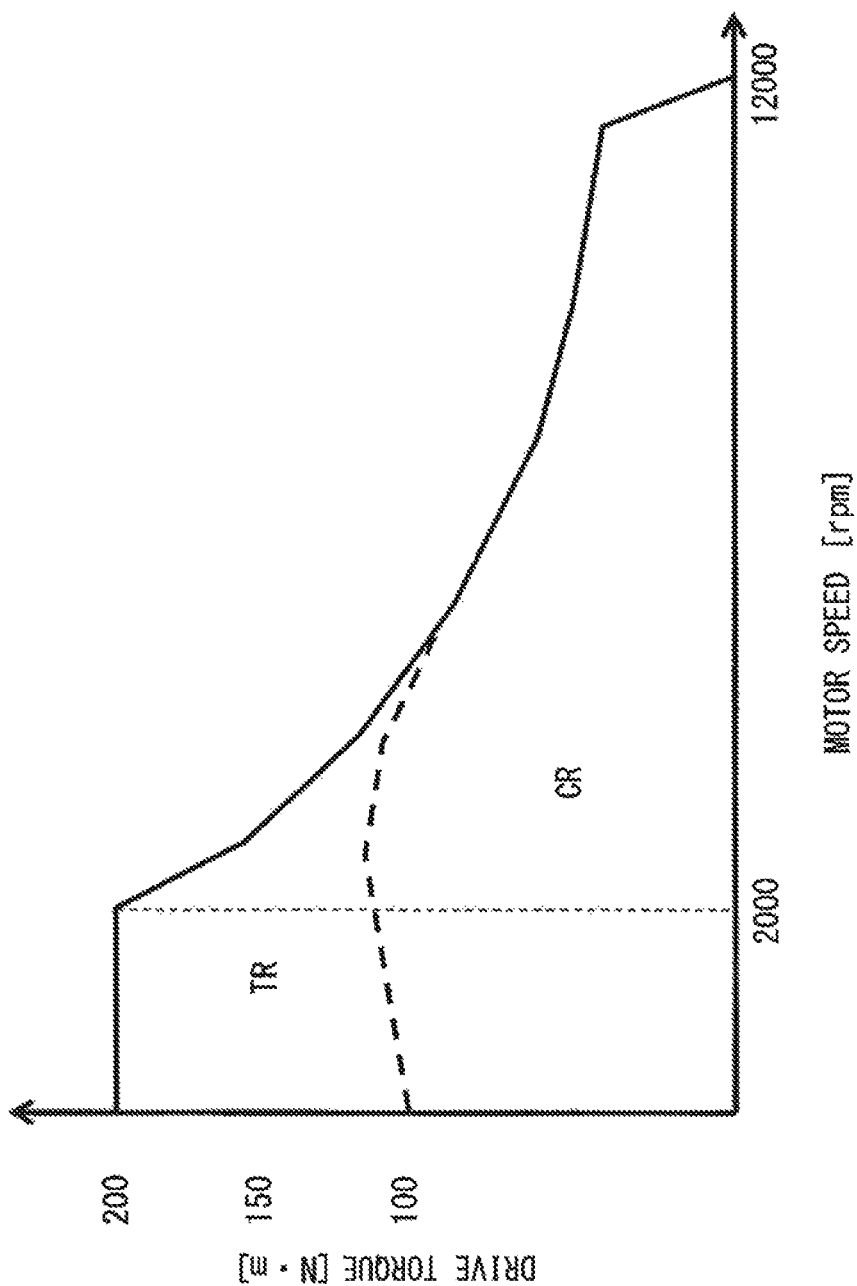
FIG. 4 is a characteristic diagram illustrating a relationship between a speed and drive torque of a motor illustrated in FIG. 1.

FIG. 4 illustrates an example of the time rating region TR and the continuous rating region CR for the motor 20. FIG. 4 is a characteristic diagram of the motor 20, illustrating a relationship between a speed of the motor 20 and drive torque outputted from the motor 20. In FIG. 4, a horizontal axis illustrates a speed [rpm], and a vertical axis illustrates drive torque [N·m]. In the example illustrated in FIG. 4, a region of operating points, where drive torque is equal to or above approximately 100 N·m, may serve as the time rating region TR. Note that, in the example in FIG. 4, the operation guarantee temperature for the motor 20 may be 200° C.

Control Operation for Fluid Level 5S

Figure 5:
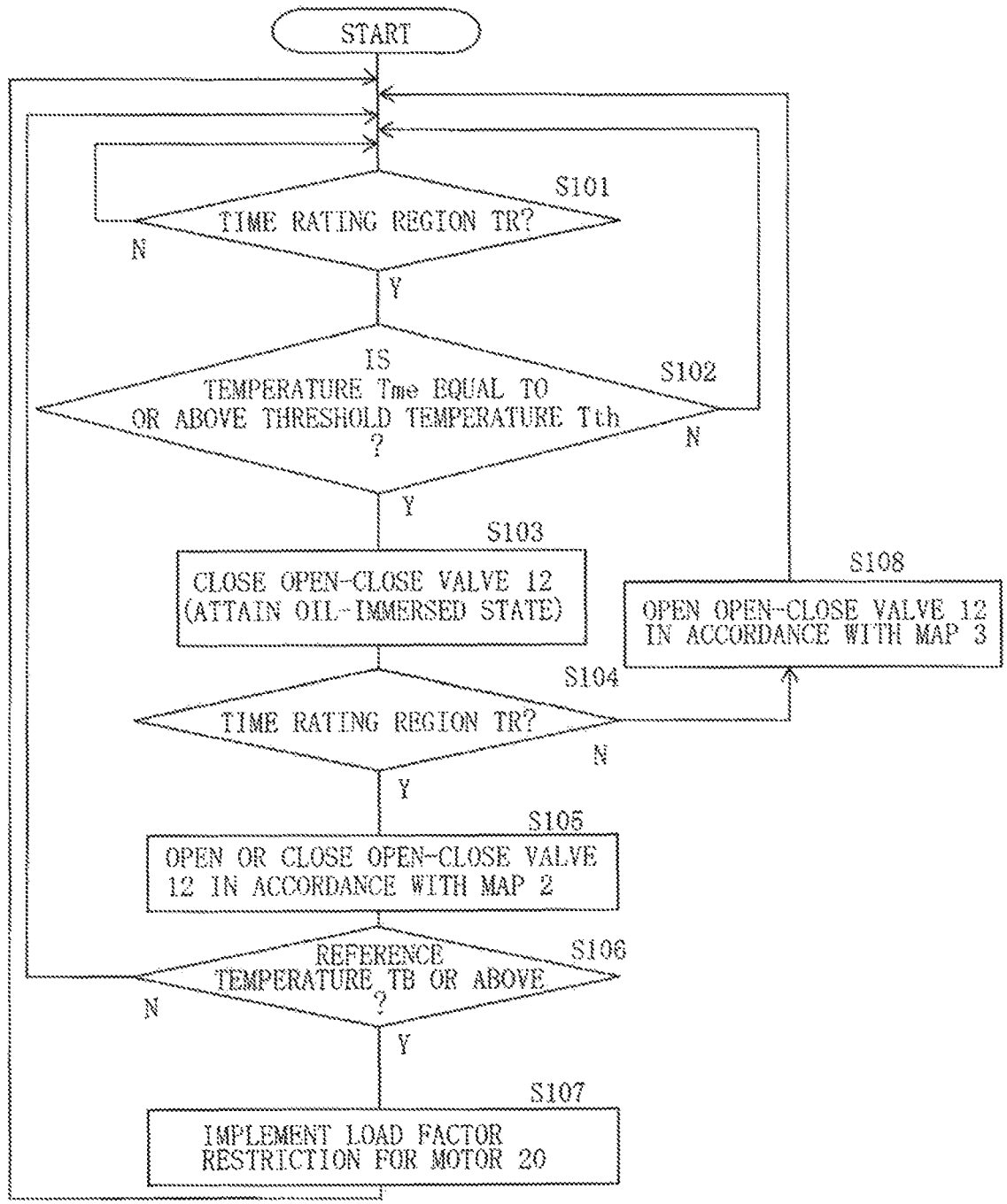
FIG. 5 is a flowchart illustrating cooling control operation for the motor in the vehicle driving apparatus illustrated in FIG. 1.
Figure 6:
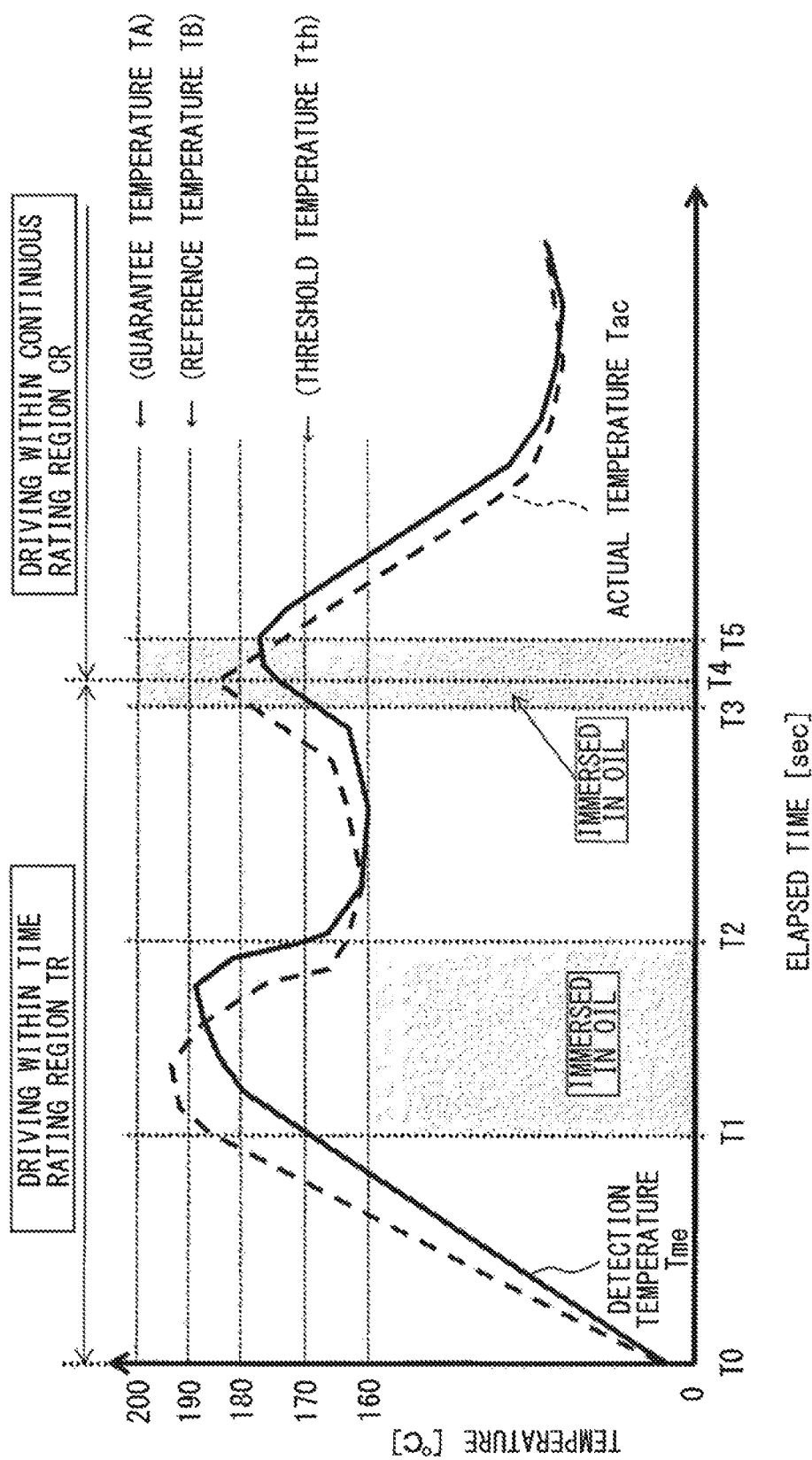
FIG. 6 is a characteristic diagram illustrating an example of a relationship between an elapsed time and a temperature of the motor during the cooling control operation illustrated in FIG. 5.

In the vehicle driving apparatus 100 according to the example embodiment, the ECU 1 may raise or lower a height position of the fluid level 5S of the cooling medium 5 in the internal space 10V to adjust cooling efficiency for the stator 23. Cooling control operation for the stator 23 will now be described herein with reference to FIGS. 5 and 6. FIG. 5 is a flowchart illustrating the cooling control operation for the stator 23. FIG. 6 is a characteristic diagram illustrating an example of a relationship between an elapsed time and a temperature of the stator 23 during the cooling control operation for the stator 23, as illustrated in FIG. 5. Note that, in FIG. 6, a temperature Tme of the stator 23 is illustrated by a solid line, and a temperature Tac of the stator 23 is illustrated by a broken line. The temperature Tme may be detected by the motor temperature sensor 41. Hereinafter, the temperature Tme may also be referred to as a detection temperature. The temperature Tac of the stator 23 may represent a temperature actually detected in the stator 23. Hereinafter, the temperature Tac may also be referred to as an actual temperature. Note that the actual temperature Tac referred to herein may denote a temperature measured by 24 thermocouples applied at equal angles in phase portions of the coil of the stator 23. The phase portions may include a u phase, a v phase, and a w phase.

As illustrated in FIG. 6, the ECU 1 may start to supply electricity to the motor 20 from a time T0 to drive the motor 20. At this time, as illustrated in FIG. 5, the ECU 1 may determine whether an operating point of the motor 20 falls within the time rating region TR (step S101). In a case where the operating point of the motor 20 does not fall within the time rating region TR (step S101: N), the ECU 1 may repeat step S101. In a case where the operating point of the motor 20 falls within the time rating region TR (step S101: Y), the ECU 1 may proceed to step S102.

It is assumed in here that, as an example, the operating point of the motor 20 falls within the time rating region TR. In other words, it is assumed in here that the motor 20 be driven within the time rating region TR. In such a case, as illustrated in FIG. 6, the detection temperature Tme of the stator 23 may reach the threshold temperature Tth at a time T1. In one example embodiment, the threshold temperature Tth may be 170° C. in FIG. 6.

The threshold temperature Tth may be determined in a comprehensive manner on the basis of energy to be loaded to the motor 20, i.e., a value of a current to be supplied to the motor 20, a temperature of the cooling medium 5, and a supply rate of the cooling medium 5 to be supplied from the cooling medium supply 30 to the motor 20, for example.

Figure 7:
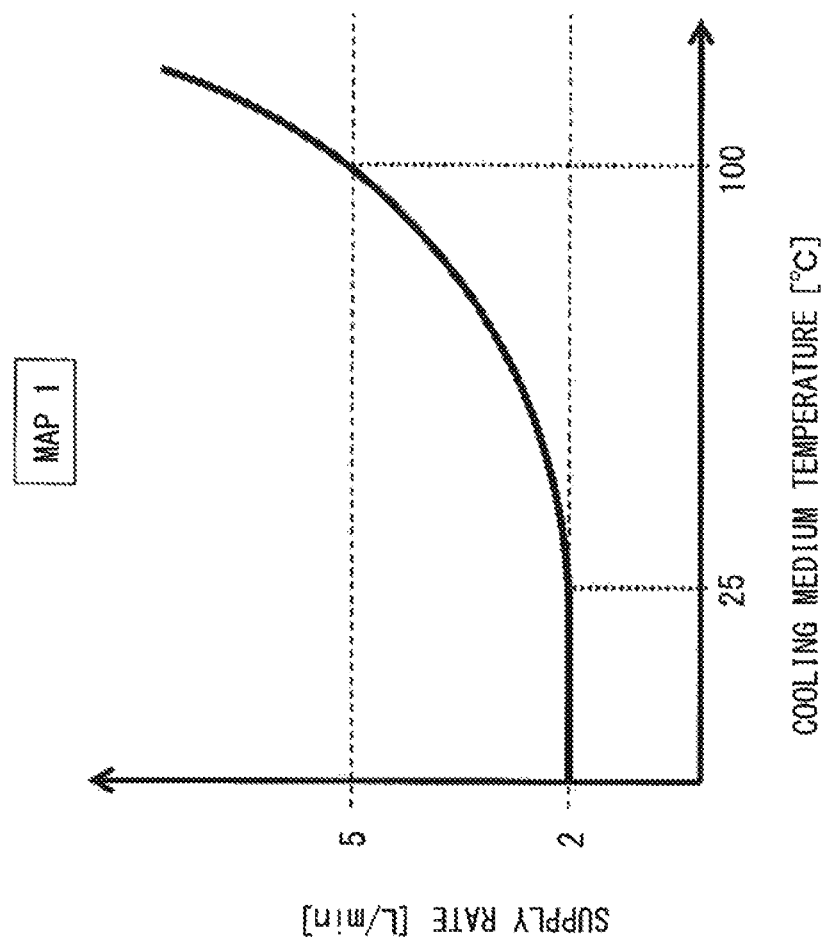
FIG. 7 is a characteristic diagram schematically illustrating a relationship between a temperature of a cooling medium and a supply rate of the cooling medium necessary to exert a predetermined cooling capability. Hereinafter, the characteristic diagram is also referred to as a map 1.

Note that a supply rate of the cooling medium 5 necessary to cool down a subject to be cooled may differ depending on a temperature of the cooling medium 5 itself. In one example embodiment, the subject to be cooled may be the stator 23. In other words, in a case where a temperature of the cooling medium 5 is lower, it is possible to cool down the stator 23 with the cooling medium 5 at a smaller amount per unit time. In a case where the temperature of the cooling medium 5 is higher, it is necessary to increase an amount per unit time of the cooling medium 5 to be supplied. To acquire a cooling capability identical to a cooling capability acquired in a case where cooling takes place with the cooling medium 5 to be supplied at a rate of two liters/min in a case where a temperature of the cooling medium 5 is 25° C., as illustrated in FIG. 7, for example, it is necessary to supply the cooling medium 5 at a rate of five liters/min in a case where the temperature of the cooling medium 5 is 100° C. FIG. 7 is a characteristic diagram schematically illustrating a relationship between a temperature of the cooling medium 5 and a supply rate of the cooling medium 5 necessary to exert a predetermined cooling capability. Hereinafter, the characteristic diagram in FIG. 7 is referred to as a map 1 for purpose of convenience.

At step S102 in FIG. 5, the ECU 1 may determine whether the detection temperature Tme is equal to or above the threshold temperature Tth. In a case where the detection temperature Tme is below the threshold temperature Tth in here (step S102: N), the ECU 1 may return to step S101. In a case where the detection temperature Tme is equal to or above the threshold temperature Tth (step S102: Y), the ECU 1 may proceed to step S103. As described above, the threshold temperature Tth may be determined in a comprehensive manner on the basis of information including a value of a current to be supplied to the motor 20, a temperature of the cooling medium 5, and a supply rate of the cooling medium 5. In one example embodiment, such a determination may be made by referring to a map 2 illustrated in FIG. 8, for example. In one example embodiment, the map 2 may be stored beforehand in a storage region in the ECU 1 or may be read as external information, for example. The map 2 illustrated in FIG. 8 illustrates the threshold temperature Tth [° C.] determined from a relationship between a temperature and a supply rate [liters/min] of the cooling medium 5 in accordance with the map 1 and a value [Arms] of a current to be supplied to the motor 20.

At step S103 in FIG. 5, the ECU 1 may turn on the open-close valve 12 to close the flow channel in the drain pipe 11. The fluid level 5S of the cooling medium 5 stored in the internal space 10V may accordingly rise. As illustrated in FIG. 3, the motor 20 may soon be wholly immersed in the cooling medium 5. Hereinafter, the state is referred to as an oil-immersed state. As a result, cooling of the motor 20 may be accelerated. As illustrated in FIG. 6, the detection temperature Tme may once rise after the time T1, and thereafter may soon start to lower. Note that the actual temperature Tac of the stator 23 may once rise after the time T1, and thereafter may soon start to lower without reaching the operation guarantee temperature TA. In one example embodiment, the operation guarantee temperature TA may be 200° C., for example. After that, the ECU 1 may determine again whether an operating point of the motor 20 falls within the time rating region TR (step S104).

In a case where the operating point of the motor 20 falls within the time rating region TR (step S104: Y), the ECU 1 may proceed to step S105. At step S105, the ECU 1 may implement the open and close operations for the open-close valve 12 in accordance with the threshold temperature Tth in the map 2 illustrated in FIG. 8. In a case where, as the motor 20 is wholly immersed in the cooling medium 5, the detection temperature Tme becomes below the threshold temperature Tth at a time T2, as illustrated in FIG. 6, for example, the ECU 1 may stop supplying of electricity to the open-close valve 12 to bring the open-close valve 12 into an open state. The cooling medium 5 stored in the internal space 10V may be accordingly discharged from the opening 10K. The fluid level 5S may thus lower. As illustrated in FIG. 1, most of the motor 20 may be exposed to air. As a result, a load against rotation of the rotor 22 may be reduced, compared with a state where the motor 20 is wholly immersed in the cooling medium 5. After that, the ECU 1 may determine whether the detection temperature Tme is equal to or above the reference temperature TB (step S106). In a case where the detection temperature Tme is equal to or above the reference temperature TB (step S106: Y), the ECU 1 may implement the output restriction, i.e., the load factor restriction, for the motor 20 (step S107). In a case where the detection temperature Tme is below the reference temperature TB (step S106: N), the ECU 1 may return to step S101 without implementing the output restriction, i.e., the load factor restriction, for the motor 20. The control as described above, implemented by the ECU 1 at step S105, of the open and close operations for the open-close valve 12 in accordance with the map 2 illustrated in FIG. 8 may serve as "first open and close control" in one embodiment.

In a case where the detection temperature Tme is equal to or above the threshold temperature Tth at step S105, the ECU 1 may bring the open-close valve 12 into a closed state to increase an amount of the cooling medium 5 stored in the internal space 10V to allow the fluid level 5S to rise. In FIG. 6, for example, the detection temperature Tme may once lower below the threshold temperature Tth at the time T2. In one example embodiment, the threshold temperature Tth may be 170° C., for example. After that, as the motor 20 keeps being driven within the time rating region TR, the detection temperature Tme may rise again. At a time T3, the detection temperature Tme may reach again the threshold temperature Tth, i.e., 170° C., for example. The ECU 1 may therefore bring the open-close valve 12 into the closed state at the time T3 to allow the fluid level 5S of the cooling medium 5 to rise to bring whole of the motor 20 into the oil-immersed state.

In the example in FIG. 6, after the ECU 1 brings whole of the motor 20 into the oil-immersed state at the time T3, an operating point of the motor 20 may be switched from the time rating region TR to the continuous rating region CR at a time T4. In this case, the ECU 1 may determine that the operating point of the motor 20 does not fall within the time rating region TR at step S104 in FIG. 5 (step S104: N). The ECU 1 may thereafter proceed to step S108.

At step S108, after a predetermined closing period has passed, the ECU 1 may bring the open-close valve 12 into the open state. The predetermined closing period for the open-close valve 12 may be determined in a comprehensive manner on the basis of information including a value of a current to be supplied to the motor 20, a temperature of the cooling medium 5, and a supply rate of the cooling medium 5. In one example embodiment, such a determination may be made by referring to a map 3 illustrated in FIG. 9, for example. In one example embodiment, the map 3 may be stored beforehand in the storage region in the ECU 1 or may be read as external information, for example. The map 3 in FIG. 9 illustrates a closing period [sec] for the open-close valve 12. The closing period may be determined from a relationship between a temperature and a supply rate [liters/min] of the cooling medium 5 in accordance with the map 1 and a value [Arms] of a current to be supplied to the motor 20. In a case where it is assumed that an operating point of the motor 20 falls within the continuous rating region CR, the actual temperature Tac of the stator 23 may not reach the operation guarantee temperature TA, i.e., 200° C., for example, unless an operating point of the motor 20 switches and falls within the time rating region TR even if the motor 20 keeps being driven. At step S108, the open-close valve 12 may therefore not open until the predetermined closing period illustrating in the map 3 in FIG. 9 has passed to keep whole of the motor 20 in the oil-immersed state to fully cool down the stator 23. After that, the ECU 1 may bring the open-close valve 12 into the open state at a time T5 to discharge the cooling medium 5 from the internal space 10V. After that, the ECU 1 may return to step S101. Note that, although the actual temperature Tac and the detection temperature Tme of the stator 23 are both higher than the threshold temperature Tth, i.e., 170° C., for example, at the time T5, the ECU 1 may bring the open-close valve 12 into the open state to lower a height position of the fluid level 5S. One reason for this is that, since an operating point of the motor 20 falls within the continuous rating region CR, it is not necessary to accelerate cooling of the motor 20. Note that the control, implemented by the ECU 1 at step S108, of the open and close operations for the open-close valve 12 in accordance with the map 3 in FIG. 9 may serve as "second open and close control" in one embodiment.

Workings and Example Effects of Vehicle Driving Apparatus 100

With the vehicle driving apparatus 100 according to the example embodiment, an amount of the cooling medium 5 stored in the internal space 10V of the housing 10 may be increased to allow the fluid level 5S to rise in a case where it is predicted that a temperature, i.e., the actual temperature Tac, of the stator 23 exceeds the operation guarantee temperature TA. For the motor 20, an area immersed in the cooling medium 5 may thus expand, accelerating cooling of the motor 20 with the cooling medium 5.

Furthermore, cooling of the motor 20 with the cooling medium 5 may be accelerated before starting the output restriction, i.e., the load factor restriction, for the motor 20 in the vehicle driving apparatus 100. This makes it possible to extend a period of time before starting the output restriction for the motor 20 or to avoid the output restriction for the motor 20 from taking place.

With the vehicle driving apparatus 100, it is therefore possible to effectively cool down the motor 20 to avoid the motor 20 from being excessively heated, fully exerting the output capability of the motor 20.

By allowing, for example, the ECU 1 to predict a change in temperature in the stator 23 on the basis of a magnitude of energy to be loaded to the motor 20 and the detection signal S41 to determine a timing of starting the output restriction for the motor 20, it is possible to avoid the motor 20 from being damaged, but to further exert drive performance possessed by the motor 20 without performing excessive protection for the motor 20.

By allowing, for example, the ECU 1 to predict a change in temperature in the stator 23 on the basis a magnitude of energy to be loaded to the motor 20, the detection signal S41, and the detection signal S42 to determine a timing of starting the output restriction for the motor 20, it is possible to avoid the motor 20 from being damaged, but to still further exert the drive performance possessed by the motor 20 without performing excessive protection for the motor 20.

By allowing, for example, the ECU 1 to predict a change in temperature in the stator 23 by taking into account a supply rate of the cooling medium 5 in addition to a magnitude of energy to be loaded to the motor 20, the detection signal S41, and the detection signal S42 to determine a timing of starting the output restriction for the motor 20, it is possible to highly precisely implement the cooling control for the motor 20. As a result, it is possible to avoid the motor 20 from being damaged, but to yet still further exert the drive performance possessed by the motor 20 without performing excessive protection for the motor 20.

In the vehicle driving apparatus 100, the ECU 1 may start the output restriction for the motor 20 when a temperature, i.e., the detection temperature Tme, of the stator 23 reaches the reference temperature TB, making it possible to securely perform protection for the motor 20.

In the vehicle driving apparatus 100, the ECU 1 may drive the motor 20 while allowing the motor 20 to be immersed in the cooling medium 5 in a case where it is necessary to accelerate cooling of the motor 20. In a case where it is not necessary to accelerate cooling of the motor 20, however, the ECU 1 may drive the motor 20 while allowing most of the motor 20 to be exposed to air. This thus makes it possible to reduce a load generated by the cooling medium 5 against the motor 20 in a case where it is not necessary to accelerate cooling of the motor 20, achieving power saving when the motor 20 is driven. Hereinafter, the load generated by the cooling medium 5 against the motor 20 may also be referred to as resistance to stirring. At that time, the ECU 1 may determine whether an operating point of the motor 20 falls within the time rating region TR or the continuous rating region CR to control the open and close operations for the open-close valve 12. This makes it possible to efficiently cool down the motor 20, as well as to efficiently achieve power saving.

2. Modification Examples

Although some example embodiments of the technology have been described in the foregoing, the technology is by no means limited to the example embodiments described above. Various changes and modifications may be made to any embodiment without departing from the scope of the technology.

In the example embodiment described above, the motor 20 may be wholly immersed in the cooling medium 5 in a case where the fluid level 5S is allowed to rise. In one example embodiment, however, the motor 20 may be in a state where the motor 20 is only partially immersed in the cooling medium 5 even in a case where the fluid level 5S is allowed to rise, for example.

In the example embodiment described above, the ECU 1 may set the threshold temperature Tth at which the open-close valve 12 is closed in accordance with a magnitude of energy to be loaded to the motor 20 in the first open and close control. In the second open and close control, the ECU 1 may set a period during which the open-close valve 12 is closed in accordance with a magnitude of energy to be loaded to the motor 20. In one example embodiment, the period during which the open-close valve 12 is closed may be a period during which the motor 20 is immersed in the cooling medium 5. In any embodiment of the technology, however, the threshold temperature Tth and a period during which the open-close valve 12 is closed may both be set beforehand.

In the example embodiment described above, the ECU 1 may predict a change in temperature in the stator 23 by referring to the map 2 in FIG. 8 and the map 3 in FIG. 9 and by taking into account a supply rate of the cooling medium 5 in addition to a magnitude of energy to be loaded to the motor 20, the detection signal S41, and the detection signal S42. However, the technology is not limited to the example embodiment. In one example embodiment, the ECU 1 may control the open and close operations for the open-close valve 12 on the basis of the detection temperature Tme, for example. In such a case, however, precision in predicting a change in temperature in the stator 23 may often lower, compared with the example embodiment described above where the ECU 1 predicts a change in temperature in the stator 23 by taking into account a magnitude of energy to be loaded to the motor 20, a temperature of the cooling medium 5, and a supply rate of the cooling medium 5, for example, in addition to the detection temperature Tme. The ECU 1 may therefore implement the open and close operations for the open-close valve 12 on a further safer side, i.e., cooling of the motor 20 may be accelerated at an earlier stage. To apply this measure to the example embodiment described above, the threshold temperature Tth may be set to 160° C., for example in a case where the operation guarantee temperature for the motor 20 is 200° C. Such control may be implemented that the ECU 1 brings the open-close valve 12 into the open state in a case where the detection temperature Tme is below 160° C., whereas the ECU 1 brings the open-close valve 12 into the closed state in a case where the detection temperature Tme is equal to or above 160° C. Even in a case where the ECU 1 controls the open and close operations for the open-close valve 12 on the basis of the detection temperature Tme, as described above, it is possible to accelerate cooling of the motor 20 with the cooling medium 5 before starting the output restriction, i.e., the load factor restriction, for the motor 20. The cooling control for the motor 20 may however be regarded as slightly excessive protection, compared with the example embodiment described above.

The example embodiment has been described with reference to a vehicle driving apparatus mounted on an electric vehicle as an example. However, the technology is not limited to the example. It is possible to apply any embodiment of the technology to rotary driving apparatuses mounted on conveyances such as ships, vessels, and airplanes, other than vehicles, to drive rotating bodies of the conveyances. It is also possible to apply any embodiment of the technology to rotary driving apparatuses mounted on stationary machines such as construction machines and working robots to drive rotating bodies of the stationary machines.

The example effects described above are merely illustrative and non-limiting. Any embodiment may achieve an effect other than the example effects described above.

As described above, in the rotary driving apparatus according to one example embodiment of the technology, in a case where it is predicted that the temperature of the stator exceeds the operation guarantee temperature for the motor and the motor is driven at an operating point falling within the time rating region for the motor, an amount of the cooling medium stored in the housing is increased, making it possible to accelerate cooling of the motor with the cooling medium. Furthermore, cooling of the motor with the cooling medium may be accelerated before starting the output restriction for the motor. This makes it possible to extend a period of time before starting the output restriction for the motor or to avoid the output restriction for the motor from taking place.

The rotary driving apparatus according to one example embodiment of the technology may predict the temperature of the stator and change an amount of the cooling medium stored in the housing to control cooling of the motor. It is therefore possible to effectively cool down the motor to avoid the motor from being excessively heated, fully exerting the output capability of the motor.

Accordingly, the rotary driving apparatus according to one example embodiment of the technology makes it possible to avoid a motor from being excessively heated, but to fully exert its output capability.

The ECU 1 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the ECU 1 illustrated in FIG. 1.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A rotary driving apparatus comprising:
   a motor including a rotor and a stator;
   a first temperature sensor configured to detect a temperature of the stator and issue a first detection signal including information of the temperature of the stator;
   a housing that accommodates the motor;
   a cooling medium supply provided in the housing, the cooling medium supply being able to supply a cooling medium to the motor;
   an open-close valve provided at a lower portion of the housing, the open-close valve being able to open and close to allow, when closed, the cooling medium to be stored inside the housing and to allow, when open, the cooling medium to be discharged from inside the housing; and
   a controller configured to predict a change in temperature in the stator on a basis of the first detection signal to close, on a condition that the temperature of the stator is predicted to exceed an operation guarantee temperature for the motor, and that the motor is driven at an operating point falling within a time rating region for the motor, the open-close valve before starting output restriction for the motor, to thereby increase an amount of the cooling medium stored inside the housing.

2. The rotary driving apparatus according to claim 1, wherein the controller is configured to control operation of the open-close valve by predicting the change in temperature in the stator on a basis of a magnitude of energy to be loaded to the motor and the first detection signal.

3. The rotary driving apparatus according to claim 1, further comprising a second temperature sensor configured to detect a temperature of the cooling medium and issue a second detection signal including information of the temperature of the cooling medium,
   wherein the controller is configured to control operation of the open-close valve by predicting the change in temperature in the stator on a basis of a magnitude of energy to be loaded to the motor, the first detection signal, and the second detection signal.

4. The rotary driving apparatus according to claim 3, wherein
   the controller is configured to control operation of the open-close valve by predicting the change in temperature in the stator on a basis of the magnitude of energy to be loaded to the motor, the first detection signal, the second detection signal, and a supply rate of the cooling medium to be supplied by the cooling medium supply to the motor.

5. The rotary driving apparatus according to claim 1, wherein
   the controller is configured to allow the open-close valve to operate in accordance with first open and close control on a condition that the motor is driven at the operating point falling within the time rating region, and the first open and close control causes, on a condition that the temperature of the stator based on the first detection signal is equal to or above a threshold temperature, the open-close valve to close to increase an amount of the cooling medium stored inside the housing, and, on a condition that the temperature of the stator based on the first detection signal is below the threshold temperature, the open-close valve to open to decrease an amount of the cooling medium stored inside the housing.

6. The rotary driving apparatus according to claim 2, wherein the controller is configured to allow the open-close valve to operate in accordance with first open and close control on a condition that the motor is driven at the operating point falling within the time rating region, and the first open and close control causes, on a condition that the temperature of the stator based on the first detection signal is equal to or above a threshold temperature, the open-close valve to close to increase an amount of the cooling medium stored inside the housing, and, on a condition that the temperature of the stator based on the first detection signal is below the threshold temperature, the open-close valve to open to decrease an amount of the cooling medium stored inside the housing.

7. The rotary driving apparatus according to claim 3, wherein the controller is configured to allow the open-close valve to operate in accordance with first open and close control on a condition that the motor is driven at the operating point falling within the time rating region, and the first open and close control causes, on a condition that the temperature of the stator based on the first detection signal is equal to or above a threshold temperature, the open-close valve to close to increase an amount of the cooling medium stored inside the housing, and, on a condition that the temperature of the stator based on the first detection signal is below the threshold temperature, the open-close valve to open to decrease an amount of the cooling medium stored inside the housing.

8. The rotary driving apparatus according to claim 1, wherein the controller is configured to allow the open-close valve to operate in accordance with second open and close control on a condition that the motor is driven at an operating point falling within a continuous rating region for the motor in a state where the open-close valve is closed, and the second open and close control causes, after a set period during which the open-close valve is closed has passed, the open-close valve to open to decrease an amount of the cooling medium stored inside the housing.

9. The rotary driving apparatus according to claim 2, wherein the controller is configured to allow the open-close valve to operate in accordance with second open and close control on a condition that the motor is driven at an operating point falling within a continuous rating region for the motor in a state where the open-close valve is closed, and the second open and close control causes, after a set period during which the open-close valve is closed has passed, the open-close valve to open to decrease an amount of the cooling medium stored inside the housing.

10. The rotary driving apparatus according to claim 3, wherein the controller is configured to allow the open-close valve to operate in accordance with second open and close control on a condition that the motor is driven at an operating point falling within a continuous rating region for the motor in a state where the open-close valve is closed, and the second open and close control causes, after a set period during which the open-close valve is closed has passed, the open-close valve to open to decrease an amount of the cooling medium stored inside the housing.

11. The rotary driving apparatus according to claim 5, wherein the controller is configured to set the threshold temperature in accordance with a magnitude of energy to be loaded to the motor.

12. The rotary driving apparatus according to claim 6, wherein the controller is configured to set the period during which the open-close valve is closed in accordance with a magnitude of energy to be loaded to the motor.

13. The rotary driving apparatus according to claim 1, wherein the controller is configured to start the output restriction for the motor when the temperature of the stator reaches a reference temperature lower than the operation guarantee temperature.

14. The rotary driving apparatus according to claim 2, wherein the controller is configured to start the output restriction for the motor when the temperature of the stator reaches a reference temperature lower than the operation guarantee temperature.

15. The rotary driving apparatus according to claim 3, wherein the controller is configured to start the output restriction for the motor when the temperature of the stator reaches a reference temperature lower than the operation guarantee temperature.

* * * * *